United States Patent Office 3,199,675
Patented Aug. 10, 1965

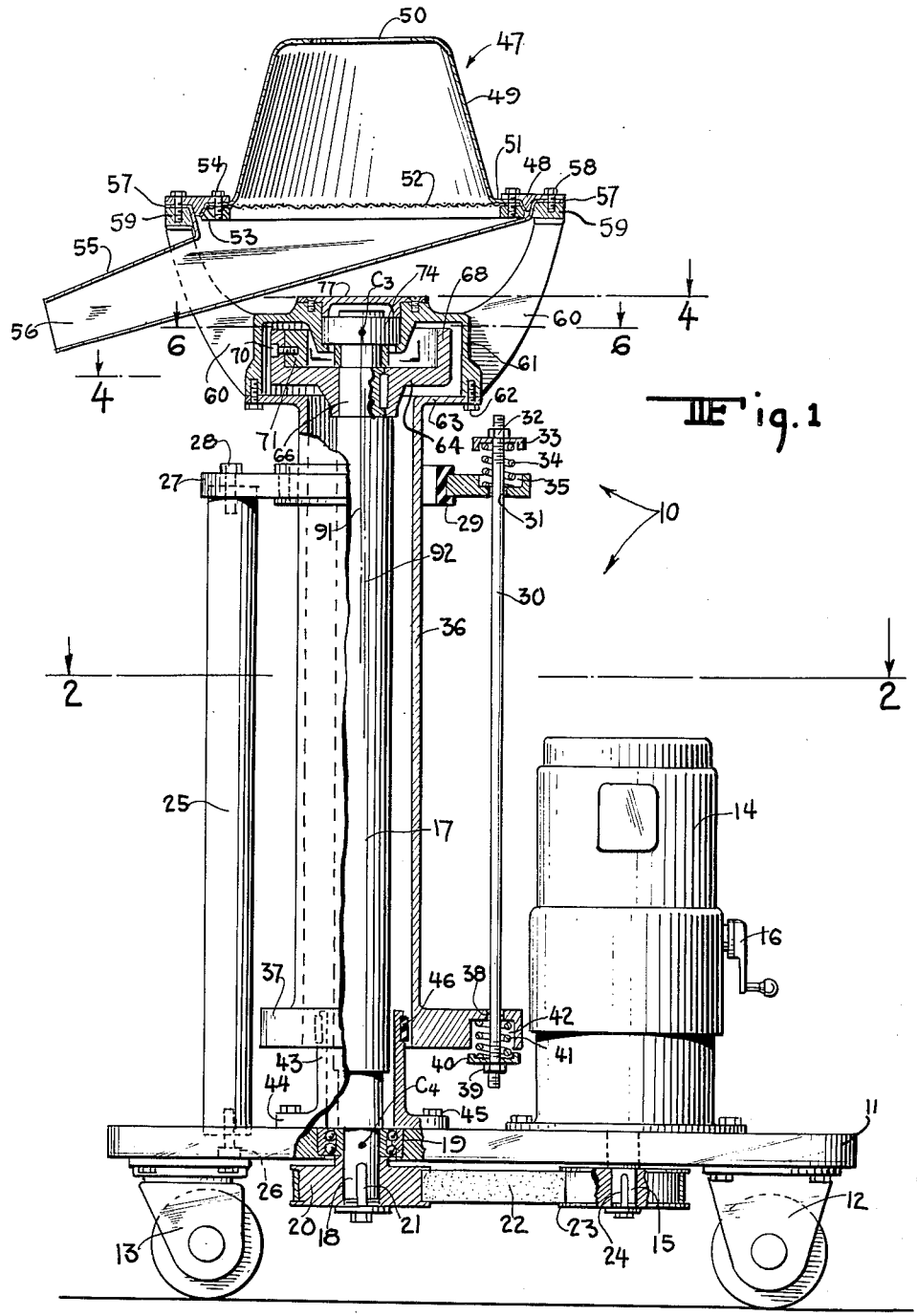

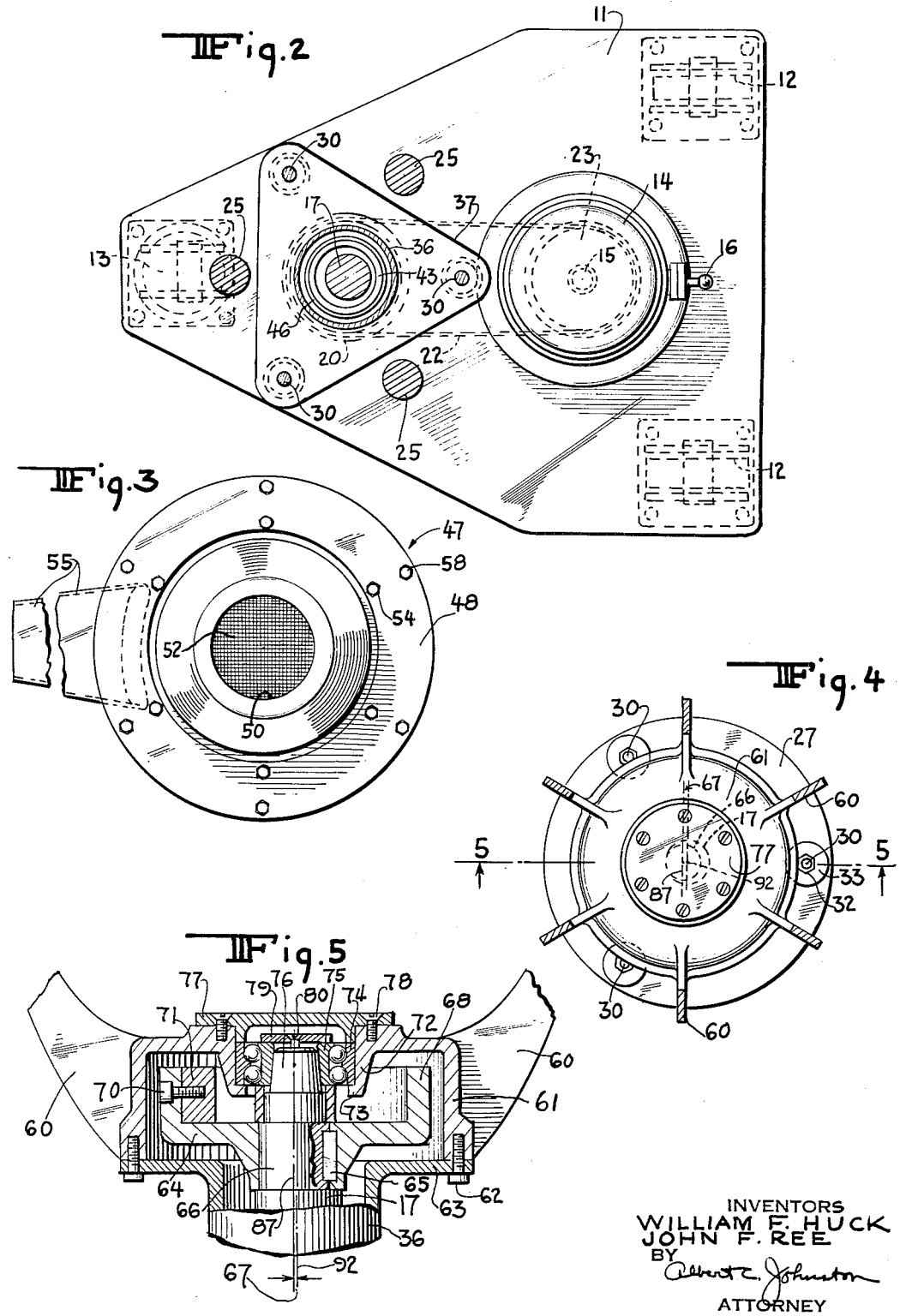

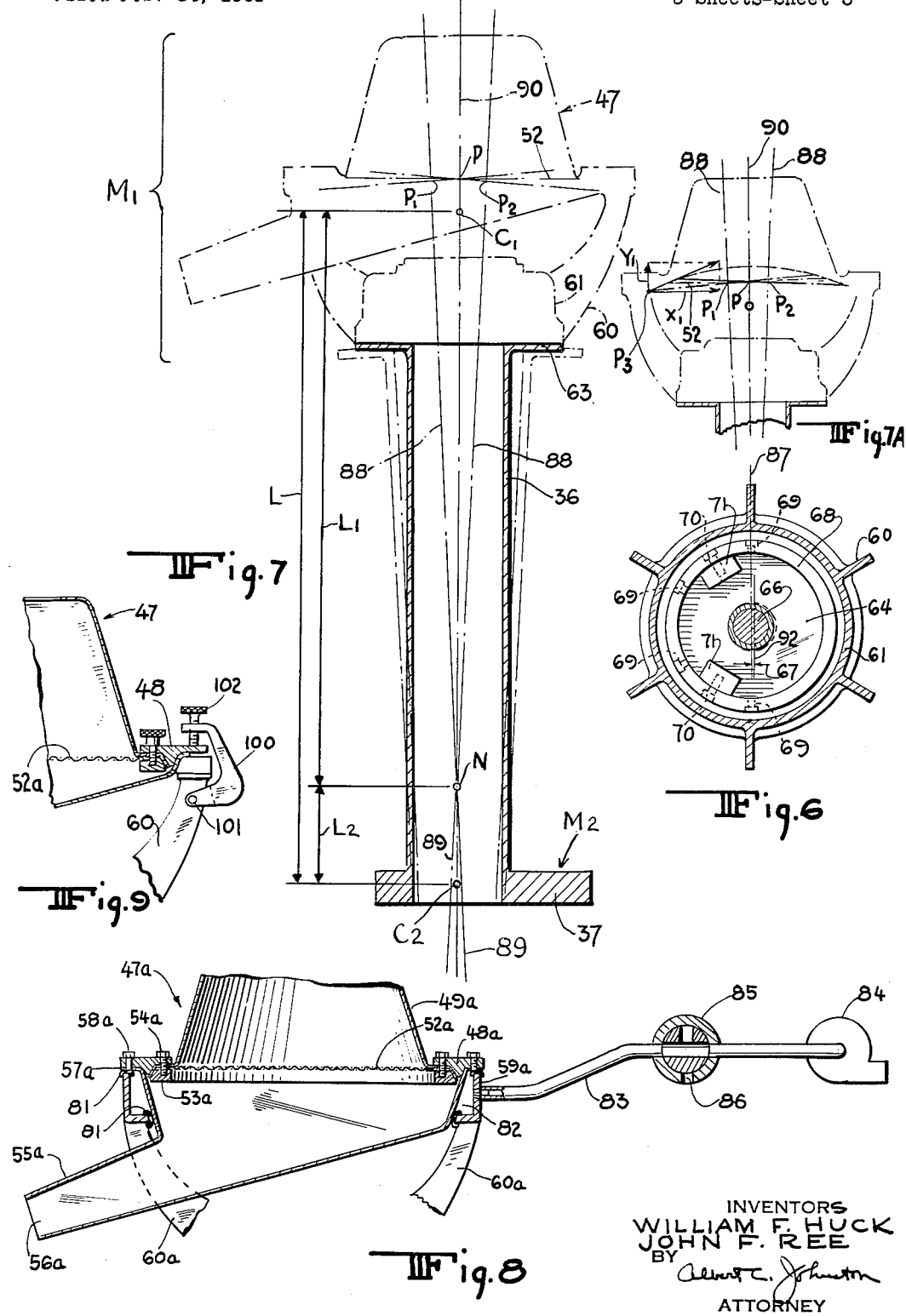

3,199,675
VIBRATORY MACHINES
William F. Huck, Forest Hills, N.Y., and John F. Ree, Glen Rock, N.J.; said Ree assignor to said Huck, doing business as Huck Company, New York, N.Y., a sole proprietorship
Filed Feb. 14, 1961, Ser. No. 89,218
20 Claims. (Cl. 209—332)

This invention relates to machines for subjecting materials to vibratory treatment and, more particularly, for effecting the high speed separation by a vibratory screening action of relatively coarse granules or agglomerates from mixtures which contain the same with relatively fluid materials such as liquids or more finely divided solids or both. The invention is particularly useful for the straining of high viscosity liquids, such as thick printing inks, paints or other pigmented compositions, and for the sifting of granular materials, such as mixtures of variously sized powders. It is also useful for the blending, mixing or levelling of constituents of such compositions or mixtures.

It is an object of this invention to provide new machines for subjecting materials to vibratory treatment, which overcome shortcomings of known techniques.

A more particular object of this invention is to provide new mechanisms for screening relatively coarse granules or agglomerates from flowable mixtures such as mixtures of finely divided solids and liquids or of variously sized granular solids such as powders, whereby the separations can be effected more rapidly and more efficiently than heretofore and can be used successfully for the straining or sifting of materials which are more viscous or otherwise more difficult to sieve or strain than the materials amenable to treatment by known screening techniques.

It is another object of the invention to provide new high speed vibratory machines of high operating efficiency which are relatively simple in construction and yet are suitable for safe and reliable operation over prolonged periods of service.

Another object is to provide a vibratory machine which is constructed and arranged so as to eliminate all play or looseness between the parts thereof subjected to rapidly changing or cyclic forces, such, for example, as a container having a screen therein for holding material to be strained or sifted and the supporting structure for such screen assembly.

Another object of the invention is to provide a vibratory machine in which vibratory movements having variously directed upward and horizontal components, the greater amplitudes of which occur at the material to be treated and which have a shearing effect on the material, are imparted to the material so as, for example, to promote the freedom of flow of liquid or fine powder components through a screen and the levelling of material supported on the screen.

Still another object is to provide a vibratory machine in which gyratory movements of high frequncy are brought about by the rotation of a shaft about an axis which at high speed is substantially true to the center line of the shaft, so as to avoid or reduce materially cyclic misalignments which otherwise would result in the supporting bearing of the shaft.

A further object is to provide a vibratory machine in which gyratory nutational movements centered at a nodal point below and remote from the material are imparted to a structure supporting material to be treated, through the rotation of a single shaft supported in upright position by a bearing at its lower end, and wherein that structure is free to assume a natural mode of vibration and yet the shaft operates without destructive cyclic misalignment of the races of its supporting bearing.

In accordance with the present invention, a screen or other structure supporting material to be screened or otherwise treated by vibratory action is subjected to gyratory nutational movements of high frequency about a nodal point located below and remote from the material while the supporting structure is held in a fixed angular relation to a line extending from a center point thereon to the nodal point. In this way the material is subjected at every point therein to horizontal and vertical components of motion which are continually varied in both amplitude and direction, which differ in amplitude or in direction, or in both, from point to point within the material so as to produce intensive shearing effects therein, and which serve to agitate and distribute the material in a manner that has been found highly conducive, for example, to the quick and efficient screening of relatively coarse granules from mixtures of liquids and finely divided solids or of finely divided dry solids.

In accordance with another aspect of the invention, a vibratory machine is provided for effecting the treatments, which comprises a base member, a non-rotary structure for supporting the material to be treated, which structure may include a container having a screen extending across it to support and for straining or sifting the material, a shaft mounted for rotation in and extending vertically from a bearing on the base member and having the supporting structure mounted on its end remote from the base member through a second bearing in which that end is rotatable but is immovable radially and angularly relative to the supporting structure, means for rotating the shaft to a high speed, and eccentric mass means fixed to the shaft and responsive to rotation of the shaft at high speed to impart to the supporting structure gyratory nutational movements of high frequency about the dynamic axis of the shaft.

Further, in order to maintain the greatest amplitudes of the nutational movements at the location of the material, and also to limit the stressing of the shaft-supporting bearing by such movements, the non-rotary supporting structure is provided with a relatively massive counterweight which is rigidly connected with that structure and is located nearer to the base member than to the second bearing. This counterweight centers the nutational movements at a nodal point remote from the material to be treated.

The eccentric mass means acting on the shaft is preferably fixed thereto at a location near to the second bearing, where it will work most efficiently to produce the nutational movements. This means comprises at least one unbalance mass or weight which is positioned to one side of the center of that bearing and effective at a high speed of rotation to dispose the dynamic axis of the shaft to the opposite side of that center at a location where the dynamic axis may be in axial alignment, or nearly so, with the bearing mounting the shaft on the base member.

The above mentioned and other important objects, features and advantages of the invention will be apparent from the following detailed description of illustrative embodiments thereof, which is to be read in connection with the accompanying drawings forming a part hereof.

In the drawings:

FIG. 1 is a side elevational view, partly broken away and in vertical section, of a vibratory machine embodying the invention;

FIG. 2 is a transverse sectional view taken along the line 2—2 of FIG. 1, and showing the base and driving section of the machine;

FIG. 3 is a top plan view of a screen assembly useful for the straining or sifting of various materials according to the invention;

FIG. 4 is a transverse sectional view taken along the line 4—4 of FIG. 1;

FIG. 5 is an enlarged vertical sectional view taken along the line 5—5 of FIG. 4;

FIG. 6 is a transverse sectional view taken along the line 6—6 of FIG. 1;

FIG. 7 is a diagrammatic illustration of movements and vectors involved in the operation of the embodiment of FIGS. 1 to 6;

FIG. 7A is a further diagrammatic illustration of varying positions and components of movement of the screen in the course of the nutational movements;

FIG. 8 is a fragmentary vertical sectional view similar to the upper portion of FIG. 1, but illustrating another embodiment of a screen assembly useful according to the invention; and FIG. 9 is a fragmentary vertical sectional view similar to a part of the upper portion of FIG. 1, but illustrating a modified means for assembling a screen container with the supporting structure.

Referring to the drawings in detail, FIG. 1 illustrates a machine 10 embodying and for carrying out the method of the present invention. This machine is shown is being movable to and from various locations by means of a base plate 11 which supports the operating parts of the machine and is in turn supported on two rigid casters 12 and one swivel-type caster 13 arranged in a triangular pattern (FIG. 2) so as to provide good stability for the machine 10 under operating conditions. A variable speed motor drive unit 14 of a type commercially available is fixed to the top side of base plate 11 with its output shaft 15 projecting downwardly through the base plate. This drive unit 14 has a control handle 16 by which the rotational speed of the output shaft 15 may be varied, for example, within the range from approximately 1100 to 3200 r.p.m.

A vertical shaft 17 has a journal 18 at its lower end which is rotatably supported in an anti-friction bearing 19 carried by base plate 11. Lower journal 18 projects below base plate 11 and has a pulley 20 secured thereon and driven by a belt 22 which runs around a pulley 23 keyed to output shaft 15 of drive unit 14.

Three vertical columns 25 are equally spaced apart around shaft 17 (FIG. 2) and have their lower ends secured to base plate 11. A ring 27 is secured on the upper ends of column 25 and has a ring-shaped rubber bumper or grommet 29 mounted in its central opening. Three tie rods 30 (FIGS. 1, 2 and 4) extend downwardly through openings 31 in ring 27 at equally spaced apart locations between columns 25. Each tie rod 30 has a threaded upper end portion receiving a nut 32 disposed above a collar 33 forming an upper abutment for a helical compression spring 34 which extends around the upper end portion of the tie rod 30 above ring 27 and has its lower end seated in a counterbore 35 opening at the upper face of ring 27.

A tube 36 having an inner diameter substantially greater than the diameter of shaft 17 extends loosely about the latter and is provided at its lower end with a relatively massive, outwardly directed flange 37 (FIGS. 1 and 2). The massive flange constitutes a counter weight functioning as hereinafter described. It is formed with holes 38 through which the lower end portions of the tie rods 30 project downwardly, and below which the lower end of each tie rod is threaded to receive a nut 39 disposed below a collar 40 which forms an abutment for the lower end of a helical compression spring 41 seated in a counterbore 42 opening at the bottom surface of flange 37. Thus, the flange 37 of tube 36 is resiliently connected with the rigidly mounted ring 27 by way of the lower springs 41, the tie rods 30 and the upper springs 34 so that the springs will yieldably resist gyrations of the flange 37 and will also exert upward force to counter the weight of the structure comprising the tube 36 and the flange 37.

A relatively short tubular member 43 (FIG. 1) is secured, as by end flange 44 and bolts 45, to base plate 11 around the lower portion of shaft 21 in spaced relation thereto. The tubular member 43 projects axially between shaft 21 and tube 36 and carries a rubber ring 46 facing outward toward the inner surface of the lower end of tube 36, with a radial clearance normally existing between rubber ring 46 and tube 36. An upper end portion of tube 36 extends through the central opening of ring 27 with a substantial radial clearance normally existing between its outer surface and the rubber bumper or grommet 29 carried by ring 27.

Tube 36 and its massive end flange 37 form part of a non-rotary vibratory structure which includes means for supporting the material to be treated by the machine. This structure as shown comprises a screen assembly generally identified by the reference numeral 47. The screen assembly includes a mounting ring 48 and a straining screen 52 extending across the ring opening within a confining housing or container defined by a side wall 49, which slopes upwardly and inwardly toward the axis of shaft 17 from the margins of the screen and leaves a central top opening 50 over the screen for the pouring or other placement of material to be treated onto the screen. A flange 51 extending outwardly at the lower edge of a container 49 and the margin of the screen are clamped together and to ring 48 by means of a clamping ring 53 and screws 54.

The screen assembly 47 further includes a discharge chute 55 underlying the screen 52 and having a laterally directed discharge opening 56 at its lower end. A flange 57 extending outwardly from the upper end of chute 55 is secured to the outer peripheral portion of ring 48.

The entire screen assembly so constituted is releasably secured, as by screws 58 in FIG. 1, to a supporting ring 59 which engages under an outer portion of ring 48 and flange 57 and, in turn, is fixed to the upper ends of a circularly arranged series of pedestals 60 expanding upwardly and outwardly from a central annular housing 61. That housing has an annular lower edge fixed, as by screws 62 (FIGS. 1 and 5), to a flange 63 extending radially outward around the upper end of tube 36.

Thus, the assembly 47, ring 59, pedestals 60, housing 61, tube 36 and counterweight flange 37 are all rigidly secured together to constitute a unitary structure supporting the material to be treated by the vibratory action of the machine. Ring 48 is formed with a downwardly extending annular rib 48a of tapered form which fits tightly between the outer edge of flange 51 on ring 53 and a portion of flange 57 at the inner side of ring 59, thus tightly wedging and effectively sealing screen assembly 47 onto support ring 59 so that material will not leak through the intersurfaces and so that the screen assembly will not become loose when subjected to vibration.

The top of housing 61 is formed with a depending annular flange 72 terminating in a rim 73 at its lower edge to provide a chamber and seat for the outer race 74 of a ball or other anti-friction bearing by which said supporting structure is mounted on the upper end of shaft 17 in a fixed angular relation to the shaft. This bearing has balls or other rolling elements confined between the outer race 74 and its inner race 75. The inner race has a tapered inner surface mating with a tapered upper end 76 of the shaft 17, onto which the inner race 75 is forced downwardly into tight fitting engagement by means of a bearing cap 79 held in place by a central screw 80 threaded in end 76. A cover plate 77 is fixed to the top of housing 61, as by screws 78, and has a flange serving as a retainer for the outer bearing race 74.

The upper bearing at 74 thus mounts the screen assembly 47 and other parts of the non-rotary vibratory structure on the upper end of shaft 17 in such manner that the shaft is rotatable but is immovable radially and angularly relative to said structure.

Further, as indicated in FIGS. 4 and 5, the shaft extension 66 is preferably made eccentric to the geometric center line 92 of the body of shaft 17, so that its vertical center line at 87, hence the center point $C_3$ (FIG. 1) of the bearing, is spaced to one side of the center line 92 by a distance 67.

It results that in the static condition of the machine, or when the shaft 17 is rotated at a very low speed, there is an axis or center line of the system which extends along line 91 (FIG. 1) between the center point $C_3$ of the upper bearing 74 and the center point $C_4$ of the lower bearing 19, and which lies at an angle to the center line 92 of the body of shaft 17 with the apex of the angle at point $C_4$. Rotation of the shaft about this axis at line 91 would of course not produce the desired nutational movements, although some vibrations might result from eccentricities of the shaft body with respect to that line.

In order to produce the desired nutational movements, an eccentric or unbalance mass means is fixed to an upper end portion of the shaft 17. As shown in FIGS. 1 and 5, this means includes a flywheel 64 which is keyed to shaft extension 66 at a location near the upper bearing 74, and which has an upwardly directed annular wall 68 arranged to rotate freely in a chamber of housing 61 surrounding the bearing chamber at 72. The flywheel itself preferably is concentric with respect to the center line 87 of the shaft extension 66. As seen in FIG. 6, however, its side wall 68 is formed with a series of radial holes 69 which are spaced apart about the portion of it lying to the same side of the center line 92 as the center point $C_3$ of the upper bearing; and two weights or unbalance masses 71 are fixed at selected locations on the wall 68, as by screws 70 passed through a selected pair of the holes 69, so that these eccentric or unbalance masses on the flywheel will act to dispose the dynamic axis of the shaft 17 at a desired location in response to high speed rotation of the shaft.

It will be apparent that in the arrangement shown, the eccentric masses fixed to the shaft will function under rotation at high speed to bring the shaft into dynamic balance about an axis displaced to the side of the center point $C_3$ (line 91) opposite to the side thereof at which these masses are located. Thus they dispose the dynamic axis of the shaft away from line 91 toward the geometric center line 92 of the shaft body; and in this dynamic condition of the machine the center point $C_3$ of the upper bearing is revolved around the dynamic axis of the shaft. The center point $C_3$, therefore, moves bodily in a circular path on the edge of a conical surface of revolution; and since the non-rotary vibratory structure is mounted on the upper bearing in a fixed angular relation thereto, that structure as well is carried bodily about the edge of a cone so as to undergo gyratory nutational movements of high frequency in response to high speed rotation of the shaft 17.

It will also be apparent that the extent of the displacement of the dynamic axis of the shaft away from the center point $C_3$ of the upper bearing will vary with the weight and the location of the eccentric masses. For masses of a given weight, the farther they are disposed away from plane 87 (FIG. 6) to the side of that plane opposite to the side thereof occupied by center line 92, the greater will be the displacement. The location of the masses on the flywheel thus determines the amplitude of the nutational movements. The desired amplitude thereof is readily obtained in the illustrated form of the machine by fixing the masses 71 at appropriate hole locations on the flywheel wall.

As shown in FIG. 6, for example, the masses are located at an intermediate position in which they will function to dispose the dynamic axis of the shaft substantially in coincidence with the geometric center line 92. The radius of the gyration of center point $C_3$ about the dynamic axis thus corresponds to the distance 67, and gyratory nutational movements of corresponding amplitude are imparted to the structure comprising the screen assembly.

Further, in this condition of operation, the shaft will run true in the lower bearing 19 so as to impose by its high speed rotation no objectionable cyclic loads on that bearing. If the masses are relocated away from such an intermediate position so as to lie closer to or farther from the plane 87, the dynamic axis of the shaft rotation will no longer coincide exactly with the center line 92; and yet a considerable range of amplitude adjustment can be obtained in this way without imposing destructive loads on the lower bearing.

The eccentric mass or masses fixed to the shaft 17 should at all times be symmetrical with respect to the plane passing through the center point $C_3$ of the upper bearing and the center line 92 of the shaft body, so that the shaft will rotate in suitable state of dynamic balance. The use of equal masses disposed symmetrically at opposite sides of that plane enables amplitude adjustments to be made by changes of their location without loss of the required dynamic balance.

The frequency of the gyratory movements imparted to the structure supporting the screen is determined by the speed of the shaft 17, which in turn is variable in the illustrated machine by adjustment of the speed control 16 of the variable speed drive unit 14.

It will be further evident that in accordance with this invention the structure supporting the material to be treated, including the screen assembly 47, is mounted on and moved by the bearing on the free upper end portion of shaft 17 in such manner that it can assume its own natural mode of vibration. In the operation of the machine shown, the movements of that structure which take place about the dynamic axis of the shaft are caused to be centered at a nodal point located below and remote from the screen, for example, at a point near the lower end of tube 36 as indicated at N in FIG. 7. This remote location of the nodal point results from the provision of the counterweight 37 on the lower end of the tube, which counterweight has an effective mass $M_2$ (FIG. 7) that is large in comparison with the combined effective mass $M_1$ of the screen assembly, its supporting structure and the material held for treatment on the screen.

The counterweight thus confines the vibratory motion of the non-rotary structure carried by the shaft end to a desired mode, in accordance with a known principle to the effect that in a vibrating system composed of two relatively heavy masses $M_1$ and $M_2$ located at opposite ends of a relatively light rigid member of length L, the distances $L_1$ and $L_2$ from the respective centers of gravity $C_1$ and $C_2$ of the masses $M_1$ and $M_2$ to the nodal point N vary inversely with the magnitudes of the respective masses. Stated mathematically, $$\frac{M_1}{M_2} = \frac{L_2}{L_1}$$

By virtue of the remotely located counterweight 37 and the vibratory motion imparted to the screen supporting structure through bearing 74, the center line of that structure, which extends from a fixed center point P on the screen 52 through the nodal point N, generates conical surfaces of revolution 88 and 89 (FIG. 7) about the dynamic axis 90 of shaft 17. The apices of these surfaces meet at the nodal point N, and since this point is much closer to flange 37 than to screen 52, the gyratory nutational movements occur with far greater amplitude at the level of the screen 52 than at the level of the counterweight.

The relatively small amplitude of the movements occurring at the counterweight 37 is readily absorbed by the springs 34 and 41 engaging ring 27 and flange 37, respectively, so that little or no vibration is transmitted to ring 27, columns 25 and base plate 11. Thus the drive unit 14 is effectively isolated from harmful vibrations.

The character of the nutational movements taking place at the level of the screen is in part represented schematically by the diagram of FIG. 7A. In the static condition of the machine, the center point P of the screen is located at point $P_0$ substantially on the vertical center line of shaft 17. In the dynamic condition the same point is gyrated in a circular path about the dynamic axis 90 of the shaft, occupying positions $P_1$ and $P_2$ at diametrically opposite points of its path. All other points on the screen move in substantially elliptical sloped paths the major amplitudes of which lie transverse to the dynamic axis and are cyclically reversed in direction, and the minor amplitudes of which are vertical and directed alternately upward and downward relative to the force of gravity acting upon material on the screen. In a half-cycle of the screen, corresponding to a half-revolution of the shaft 17 and to the transition of point P from position $P_1$ to position $P_2$, an edge point of the screen at $P_3$ will travel in a path the slope of which is represented by the diagonal arrow in FIG. 7A, and which has radially inward and upward components represented by the arrows $X_1$ and $Y_1$, respectively. In the next half-cycle of the screen the directions of the components of movement of the same point are reversed.

Further, the vertical components of the movements of different points on the screen vary in magnitude according to the radial distances of the points from the center point P, and the directions of the various components vary according to the angular locations of the points about the dynamic axis. Accordingly, the various increments or parts of a mixture supported on the screen are subjected to heterogeneous shaking, jogging and shearing forces of varying directions and magnitudes which will thoroughly agitate and disrupt a mass of material and quickly distribute its relatively fluid constituents through the screen openings while leaving relatively coarse constituents separated above the screen.

The vertical components of the nutational screen movements, although smaller in amplitude than the horizontal components, impart cylically reversing vertical accelerating forces to the material which are especially important to the achievement of the desired effects. By cyclically increasing and decreasing the vertical loading of increments of the material against the screen, they tend alternately to force the increments through the screen and then to move the screen away from the retained increments so that the horizontal components may displace the latter over the upper surface of the screen. In this way, granules which otherwise would clog the screen openings are continually displaced and suspended over the screen, and are prevented from obstructing the efficient and rapid continuation of straining or shifting operations.

According to the invention, it is possible to strain or sift successfully materials which are considerably more viscous or more coherent than those amenable to successful treatment by known vibratory techniques.

In the operation of the machine here illustrated, a viscous liquid to be strained, such as a printing ink of medium or high viscosity, or a mixture of granules or powders to be sifted, is supplied into the container 49 of the screen assembly 47 through the top opening 50, and the drive unit 14 is energized to effect high speed rotation of the shaft 17, and corresponding high frequency gyratory nutational movements of the screen assembly as already described. The movements of the screen tend to displace material at its edge inwardly and over its surface. Further, it has been found that the upwardly and inwardly sloped side wall of the container 49 serves to deflect downwardly toward the screen parts of the material in contact with that wall, thus having a "pumping" effect which increases the rate of flow through the screen beyond the rate achieved with a cylindrical screen enclosure.

Tests have shown that the optimum efficiency of the screening operation usually occurs at critical frequencies which usually correspond to the higher operating speeds of the machine. In both the shifting of granular solids or powders and the straining of liquids, the critical frequency varies according to the material being processed. For example, a frequency differing by as much as 200 cycles per minute from the critical frequency for a particular material may result in as much as a 20 to 25% reduction of the rate of flow of the material through the screen. The optimum or critical frequency for achieving the maximum rate of flow of a given material through the screen of a given machine can readily be determined empirically. It may vary for a given material from time to time by reason of changes in the consistency of the material or in atmospheric moisture or temperature.

As is apparent in FIG. 1, adjustments of the nuts 32 and 39 on the tie rods 30 can be made to increase the force exerted by springs 34 and 41 so that the spring force will tend to displace tube 36 and housing 61 upwardly relative to shaft 17, thereby preloading the upper anti-friction bearing by upward displacement of its outer race 74 (FIG. 5) relative to its inner race 75. Such preloading may then be counteracted by the weight of the material supported on the screen 52, so that when the machine is operated the upper bearing will not be overloaded and its races will remain in correct axial alignment. The axial preloading of the upper bearing further removes any axial play therein, and any radial play therein is taken up by the tight wedging of the inner race 75 onto the tapered shaft end 76 when the upper bearing is assembled.

The limitation of the axial load on the upper bearing and the elemination of axial and radial play therein contribute to an increased operating life for that bearing, which is subject to severe cyclic dynamic loading and would be adversely affected by even small amounts of axial or radial play. In addition, the lower bearing 19 is relieved of axial or thrust loads which otherwise would occur so as to create a possibility of it being overloaded by thrust loads.

During the starting up of the machine 10 and while its operating speed is passing through the critical harmonic vibration frequency of the vibratory structure, and also when the loading of material on the screen assembly is uneven or is varied considerably, the amplitudes of gyrations may in some circumstances be quite substantial; but any excessive amplitudes are absorbed by impacts of upper and lower portions of the tube 36, respectively, against the rubber grommet 29 carried by ring 27 and the rubber ring 46 carried by the tubular section 43 on base plate 11.

The machine 10 has been illustrated and described as being employed for the purpose of imparting vibratory movements to a screen assembly 47 adapted especially to serve as a sieve or strainer for mixtures containing granular solids. It will be apparent, however, that the machine can be used for other purposes, for example, for imparting similar vibratory movements to a sealed or open container having miscible materials therein, such as paint ingredients, powders, semi-liquids or powders and liquids, for the purpose of effecting thorough mixing of the contents of the container, or for effecting the rapid and uniform levelling of a porous mass of viscous material in a sealed or open container. In the latter case, the movement imparted to the container eliminate the small but numerous cavities or pockets which tend to form and remain in the mass.

It should be noted that, although the anti-friction bearings 19 and 74, 75 at the lower ends, respectively, of shaft 17 are illustrated as ball bearings in FIGS. 1 and 5, it is possible, and even desirable in some applications, to substitute other types of anti-friction bearings.

Further, since the anti-friction bearings are subjected to rather severe operating conditions notwithstanding the described features which ameliorate the loads imposed upon them, it is desirable in some cases to provide these bearings with a lubricating and cooling system which has not been shown as such system may be of conventional design and does not form part of this invention.

In the modification of the screen assembly illustrated in FIG. 8 of the drawings, parts corresponding to parts shown in FIGS. 1 and 3 are identified by corresponding reference numerals having the letter a appended thereto. The screen assembly 47a in FIG. 8 is substantially similar to screen assembly 47, with the exception that it is held releasably in place on the vibratory supporting structure by a vacuum rather than by screws 58, so that it may be removed and replaced quite easily and quickly. To this end, the upper ends of the pedestals 60a carry a mounting ring 59a of generally L-shaped inwardly opening channel form, which presents circular upper and lower edges lined with sealing strips 81 to receive the flange 57a and a side wall portion of the discharge chute 55a in fluid-tight engagement with these edges. Thus, an annular chamber 82 is defined between mounting ring 59a and chute 55a. This chamber is connected by a flexible conduit 83 through valve 85 to the inlet of an air pump or blower 84 which will draw a vacuum in the chamber effective to hold the container assembly 47a securely in its working position. However, immediately upon the release of the suction in chamber 82, such as by turning the core of valve 85 to a vent position at port 86, the screen assembly 47a can be lifted away from the mounting ring 59a. In this way little time is consumed in removing it for maintenance or for changing the mesh size of the screen 52a, which may vary for different materials to be treated.

FIG. 9 of the drawings illustrates a further modification of the screen assembly of FIG. 1, wherein the screws 58 for securing assembly 47 to supporting ring 59 are replaced by C-shaped clamps 100 having forked lower ends pivotally mounted on pins 101 carried by the upper portions of pedestals 60. The opposite or upper end of each clamp 100 has a finger screw 102 threaded through it and formed with a tapered point for engagement in a tapered socket formed in the top surface of ring 48. These clamps facilitate rapid disengagement of the screen assembly 47 from the remainder of the machine.

Although illustrative embodiments of this invention have been described in detail herein with reference to the accompanying drawings, it is to be understood that this invention is not limited to those precise embodiments, and that various changes and modifications may be effected therein without departing from the scope or spirit of the invention defined in the appended claims.

What is claimed is:

1. A machine for subjecting materials to vibratory treatment, comprising a stationary base carrying a first bearing, a shaft mounted for rotation in and extending upwardly from said bearing in fixed angular relation to said base, a non-rotary structure for supporting the material to be treated, said structure being mounted on an upper end portion of said shaft through a second bearing in which said end portion is rotatable but is immovable radially and angularly relative to said structure, said shaft being rotatable at a low speed on an axis substantially coinciding with the centers of said bearings, driving means for rotating said shaft to a high speed, the geometric center line of the body of said shaft between said bearings being concentric with said first bearing and eccentric to said second bearings, and eccentric mass means fixed to said shaft and operative upon rotation of said shaft at high speed to displace the dynamic axis of said shaft to one side of the center of said second bearing and thereby render it substantially coincident with said center line, so as to impart to said structure gyratory nutational movements of high frequency about said dynamic axis and relieve said first bearing from destructive cyclical forces.

2. A machine as claimed in claim 1, the last recited means comprising a flywheel fixed to said shaft near to said second bearing and a plurality of weights fixed to said flywheel at the side of the center of said second bearing opposite to the location of said center line and in symmetry to the plane extending through said center and said center line.

3. A machine for subjecting materials to vibratory treatment, comprising a stationary base having a first bearing mounted thereon, an elongated shaft mounted for rotation in and extending upwardly from said bearing in fixed angular relation to said base, a non-rotary structure for supporting the material to be treated, said structure being mounted on an upper end portion of said shaft through a second bearing in which said end portion is rotatable but is immovable radially and angularly relative to said structure, said shaft being rotatable at a low speed on an axis substantially coinciding with the centers of said bearings, driving means for rotating said shaft to high speed, eccentric mass means fixed to said shaft and operative upon rotation of said shaft at high speed to dispose the dynamic axis of said shaft to one side of the center of said second bearing and substantially in axial alignment with said first bearing, so as to impart to said structure gyratory nutational movements of high frequency about said dynamic axis, and a counterweight rigidly connected with said structure and located below and remote from said second bearing to center said movements at a nodal point nearer to said base than to said structure.

4. A machine for subjecting materials to vibratory treatment, comprising a stationary base having a first bearing mounted thereon, an elongated shaft mounted for rotation in and extending upwardly from said bearing in fixed angular relation to said base, a non-rotary structure for supporting the material to be treated, said structure being mounted on an upper end portion of said shaft through a second bearing in which said end portion is rotatable but is immovable radially and angularly relative to said structure, said shaft being rotatable at a low speed on an axis substantially coinciding with the centers of said bearings, driving means for rotating said shaft to high speed, eccentric mass means fixed to said shaft and operative upon rotation of said shaft at high speed to dispose the dynamic axis of said shaft to one side of the center of said second bearing and substantially in axial alignment with said first bearing, so as to impart to said structure gyratory nutational movements of high frequency about said dynamic axis, a counterweight of greater mass than said structure rigidly connected with said structure and located below and remote from said second bearing to center said movements at a nodal point nearer to said base than to said structure, and means yieldably interconnecting said counterweight and said base to resist and absorb vibrations of said counterweight.

5. A machine for subjecting materials to vibratory screening treatment, comprising a stationary base, a bearing supported by said base, a shaft mounted for rotation in and extending upwardly from said bearing in fixed angular relation to said base, a non-rotary structure including a foraminous screen and a container surrounding said screen for supporting the material to be treated, means mounting said structure on an upper end portion of said shaft, including a second bearing in which said end portion is rotatable but is immovable radially and angularly relative to said structure, said shaft being rotatable at a low speed on an axis substantially coinciding with the centers of said bearings, driving means for rotating said shaft to high speed, eccentric mass means fixed to said shaft and operative upon rotation of said shaft at high speed to dispose the dynamic axis of said shaft to one side of the center of said second bearing, so as to impart to said structure gyratory nutational movements of high frequency about said dynamic axis, and a counterweight rigidly connected with said structure and located below and remote from said second bearing to center said movements at a nodal point below and remote from said screen.

6. A machine as claimed in claim 5, said container having a side wall extending upwardly and inwardly toward said dynamic axis from the margin of said screen, whereby material overlying said screen in contact with said side wall is impelled toward said screen in the course of said movements.

7. A vibratory machine comprising a stationary base, a bearing supported by said base, a vertical shaft rotatably supported at its lower end in said bearing in fixed angular relation to said base, a non-rotary structure for supporting material to be treated, said structure being mounted on an upper end portion of said shaft in a fixed angular relation thereto through a second bearing in which said end portion is freely rotatable, a relatively massive counterweight rigidly connected with said structure and located below and remote from said bearing, said shaft being rotatable at a low speed on an axis substantially coinciding with the centers of said bearings, drive means carried by said base and operative to rotate said shaft, eccentric mass means carried by the upper end of said shaft near to said second bearing and operative upon rotation of said shaft at high speed to dispose the dynamic axis of said shaft to one side of the center of said second bearing and thereby to produce gyratory nutational movements of said structure, and means yieldably interconnecting said counterweight and said base to resist and absorb vibrations of said counterweight.

8. A vibratory machine comprising a non-rotary structure for supporting material to be treated, a stationary base, a bearing supported by said base, a vertical shaft rotatably mounted at its lower end in said bearing in fixed angular relation to said base, drive means carried by said base and operative upon the lower end of said shaft to rotate the latter, said shaft having an eccentric extension on its upper end, said structure being mounted on said shaft through an upper bearing fitted rotatably on said extension, said shaft being rotatable at a low speed on an axis substantially coinciding with the centers of said bearings, a flywheel mounted on and concentrically with said shaft near to said extension, unbalance masses, means mounting said masses at selected peripheral locations on said flywheel so that upon rotation of said shaft at high speed said masses will dispose the dynamic axis of said shaft to one side of the center of said upper bearing and toward axial alignment with the first-mentioned bearing and thereby impart to said structure gyratory movements of an amplitude determined by the locations of said masses, and a relatively massive counterweight rigidly connected with said structure and located below and remote from said upper bearing to center said movements at a nodal point nearer to said base than to said structure.

9. A machine as claimed in claim 8, and means yieldably interconnecting said counterweight and said base to resist and absorb vibrations of said counterweight, including means yieldably urging said supporting structure upwardly relative to said shaft so as to counteract the axial loading of said upper bearing by the weight of said structure and said counterweight.

10. A machine as claimed in claim 8, said extension having a tapered end, said upper bearing being an antifriction bearing having inner and outer races and rolling elements confined between said races, said inner race having a tapered inner surface mating with said tapered end; and means for forcing said inner race tightly onto said tapered end to prevent radial play between said races and said rolling elements.

11. A machine as claimed in claim 8, and bumper means fixed relative to said base and normally spaced from the unit comprised by said supporting structure and said counterweight in position to prevent excessive gyratory movements of said unit during accelerations of said shaft.

12. A machine as claimed in claim 5, said structure including a ring for supporting said container and said screen, said container and screen having an outwardly directed flange thereon adapted to seat on said ring, and means releaseably securing said flange to said ring.

13. A machine as claimed in claim 5, said structure including a series of pedestals having upper ends adjacent the periphery of said container, said container having an outwardly directed flange adapted to seat on said upper ends, and means releasably securing said container to said pedestals including on each pedestal a C-shaped clamp pivoted at one end to the pedestal and carrying at its other end a clamping screw operative to clamp said flange tightly against the upper end of the pedestal.

14. A machine as claimed in claim 5, said structure including a ring for supporting said container, said ring defining an inwardly opening channel having edges adapted to be engaged in a fluid-tight manner by external portions of said container, and means connected with said ring for drawing a vacuum in said channel to secure said container releaseably against said ring.

15. A machine for screening liquid and granular materials comprising a stationary base, a vertical shaft extending upwardly from said base, lower bearing means rotatably mounting the lower end of said shaft on and in fixed angular relation to said base, drive means mounted on said base and connected with said lower end to rotate the shaft, a container for the material to be screened and having a screen extending thereacross, a supporting structure rigidly carrying said container above the upper end of said shaft, a second bearing interconnecting said structure and an upper end portion of said shaft so that said shaft is rotatable but is immovable radially and angularly relative to said structure, said shaft being rotatable at a low speed on an axis substantially coinciding with the centers of said bearings, eccentric mass means on said shaft near said second bearing and operative upon rotation of said shaft at high speed to dispose the dynamic axis of said shaft to one side of the center of said second bearing and thereby to produce gyratory nutational movements of said structure, said structure including a rigid tube extending downwardly around said shaft with substantial radial clearance therebetween and a massive flange at the lower end of said tube defining a counterweight whereby said structure tends to gyrate with a relatively large amplitude at said screen and a relatively small amplitude at said flange, and resilient means yieldably interconnecting said flange and said base to absorb vibrations of said flange and thus isolate said base and said drive means from such vibrations.

16. A machine as claimed in claim 15, said second bearing being eccentric to the body of said shaft, said eccentric mass means being located at the same side of the center line of said shaft body as the center of said second bearing and being operative to hold the axis of rotation of said shaft at high speed substantially on said center line.

17. A machine as claimed in claim 15, said resilient means including a ring rigidly supported from said base and surrounding an upper portion of said tube, said flange and said ring having vertically aligned holes therein, tie-rods passing loosely through said aligned holes and having adjustable nuts on the opposite ends thereof, and compression springs on each tie-rod between the nuts thereon and said ring and said flange, respectively, said springs exerting an upward force on said structure to counteract axial loading of said upper bearing by the weight of said structure and said container.

18. A machine as claimed in claim 17, further comprising a rubber grommet carried by the inner periphery of said ring, a tubular member fixed to said base around said shaft and projecting upwardly between said shaft and the lower end of said tube, and a rubber bumper on the outside of said member facing toward said tube, said grommet and bumper normally being spaced radially from said tube and being engageable by the latter to limit the amplitude of gyrations of said tube.

19. A machine as claimed in claim 15, said drive means including a variable speed motor unit having an output shaft, and means positively connecting said lower end of the aforementioned shaft for rotation with an at a speed proportional to that of said output shaft so that the frequency of the gyratory movements of said structure is variable by varying the speed of said motor unit.

29. A machine for subjecting materials to vibratory treatment, comprising a base, a non-rotary structure for supporting the material to be treated, a rotary operating shaft, a lower bearing mounting said shaft on said base and tending constantly to hold said shaft in a substantially fixed upright position relative to said base, the upper portion of said shaft standing free to assume its own rotational position, an upper bearing mounting said structure on the upper end of said shaft in a fixed position relative thereto, said shaft being rotatable relative to said base and said structure about a first axis intersecting the centers of said bearings, and means operative upon rotation of said shaft at high speed to dispose the dynamic axis of said shaft to one side of the center of said upper bearing and thereby hold said center in rotation on the edge of a cone defined by rotation of said first axis about said dynamic axis, whereby said structure undergoes gyratory nutational movements of high frequency, the last-recited means comprising a fly wheel fixed to said shaft near to said upper bearing and at least one weight fixed to said fly wheel at the side of said center opposite to said one side.

References Cited by the Examiner
UNITED STATES PATENTS

| | | | |
|---|---|---|---|
| 946,716 | 1/10 | Brantingham | 74—87 |
| 2,267,143 | 12/41 | Soldan | 209—366.5 |
| 2,284,671 | 6/42 | Meinzer | 74—87 X |
| 2,723,753 | 11/55 | Cook | 209—332 |
| 2,828,013 | 3/58 | Hurst | 209—366.5 |
| 2,936,072 | 5/60 | Gray | 209—434 |
| 2,942,445 | 6/60 | Burkland | 68—23 |

HARRY B. THORNTON, *Primary Examiner.*

HERBERT L. MARTIN, *Examiner.*

UNITED STATES PATENT OFFICE
CERTIFICATE OF CORRECTION

Patent No. 3,199,675

August 10, 1965

William F. Huck et al.

It is hereby certified that error appears in the above numbered patent requiring correction and that the said Letters Patent should read as corrected below.

Column 3, line 21, for "is", second occurrence, read -- as --; column 7, line 37, for "cylically" read -- cyclically --; lines 49 and 73, for "shifting", each occurrence, read -- sifting --; column 8, line 62, after "lower" insert -- and upper --; column 11, line 32, for "flywheed" read -- flywheel --; line 70, for "releaseably" read -- releasably --.

Signed and sealed this 25th day of January 1966.

(SEAL)
Attest:

ERNEST W. SWIDER
Attesting Officer

EDWARD J. BRENNER
Commissioner of Patents